US012142146B2

(12) United States Patent
Sakai et al.

(10) Patent No.: US 12,142,146 B2
(45) **Date of Patent: *Nov. 12, 2024**

(54) VEHICULAR ENVIRONMENT ESTIMATION DEVICE

(71) Applicant: TOYOTA JIDOSHA KABUSHIKI KAISHA, Toyota (JP)

(72) Inventors: Katsuhiro Sakai, Hadano (JP); Hiromitsu Urano, Susono (JP); Toshiki Kindo, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 95 days.

This patent is subject to a terminal disclaimer.

(21) Appl. No.: 18/148,906

(22) Filed: Dec. 30, 2022

(65) Prior Publication Data

US 2023/0137183 A1 May 4, 2023

Related U.S. Application Data

(63) Continuation of application No. 17/453,796, filed on Nov. 5, 2021, now Pat. No. 11,995,988, which is a (Continued)

(30) Foreign Application Priority Data

May 18, 2009 (JP) ................................ 2009-120015

(51) Int. Cl.
*G08G 1/16* (2006.01)

(52) U.S. Cl.
CPC ............ *G08G 1/161* (2013.01); *G08G 1/166* (2013.01)

(58) Field of Classification Search
CPC .............................. G08G 1/161; G08G 1/166
See application file for complete search history.

(56) References Cited

U.S. PATENT DOCUMENTS 4,072,945 A 2/1978 Katsumata et al.
5,422,829 A 6/1995 Pollock
(Continued)

FOREIGN PATENT DOCUMENTS

DE 10 2007 011 122 A1 9/2007
DE 10 2006 017 177 A1 10/2007
(Continued)

OTHER PUBLICATIONS

Office Action mailed Jul. 20, 2023, in co-pending U.S. Appl. No. 17/453,775.
(Continued)

*Primary Examiner* — Jelani A Smith
*Assistant Examiner* — Alyssa Rorie
(74) *Attorney, Agent, or Firm* — Oblon, McClelland, Maier & Neustadt, L.L.P.

(57) ABSTRACT

Disclosed is a vehicular environment estimation device capable of accurately estimating a travel environment around own vehicle on the basis of a predicted route of a mobile object or the like, which is moving in a blind area. A vehicular environment estimation device that is mounted in the own vehicle detects a behavior of another vehicle in the vicinity of the own vehicle, and estimates a travel environment, which affects the traveling of another vehicle, on the basis of the behavior of another vehicle. For example, the presence of another vehicle, which is traveling in a blind area, is estimated on the basis of the behavior of another vehicle. Therefore, it is possible to estimate a vehicle travel environment that cannot be recognized by the own vehicle but can be recognized by another vehicle in the vicinity of the own vehicle.

4 Claims, 12 Drawing Sheets

Related U.S. Application Data continuation of application No. 15/293,674, filed on Oct. 14, 2016, now Pat. No. 11,568,746, which is a continuation of application No. 13/320,706, filed as application No. PCT/JP2010/057779 on Apr. 26, 2010, now Pat. No. 9,501,932.

(56) References Cited

U.S. PATENT DOCUMENTS

| | | | | |
|---|---|---|---|---|
| 6,363,326 | B1 | 3/2002 | Scully | |
| 6,615,137 | B2 * | 9/2003 | Lutter | G08G 1/162 340/436 |
| 6,720,920 | B2 * | 4/2004 | Breed | G01S 13/931 342/357.31 |
| 6,927,677 | B2 | 8/2005 | Anderson et al. | |
| 7,245,231 | B2 | 7/2007 | Kiefer et al. | |
| 8,489,284 | B2 | 7/2013 | Emam | |
| 2001/0034575 | A1 | 10/2001 | Takenaga et al. | |
| 2003/0191568 | A1 | 10/2003 | Breed | |
| 2004/0083037 | A1 | 4/2004 | Yamane et al. | |
| 2005/0012604 | A1 | 1/2005 | Takahashi | |
| 2005/0041529 | A1 | 2/2005 | Schliep et al. | |
| 2005/0060069 | A1 | 3/2005 | Breed et al. | |
| 2005/0137756 | A1 | 6/2005 | Takahashi | |
| 2007/0219709 | A1 | 9/2007 | Ikeda | |
| 2008/0040023 | A1 | 2/2008 | Breed | |
| 2008/0161987 | A1 | 7/2008 | Breed | |
| 2008/0189040 | A1 * | 8/2008 | Nasu | G08G 1/163 701/301 |
| 2008/0215231 | A1 | 9/2008 | Breed | |
| 2008/0291000 | A1 | 11/2008 | Kim et al. | |
| 2009/0005984 | A1 | 1/2009 | Bradley | |
| 2009/0058677 | A1 | 3/2009 | Tseng | |
| 2009/0252380 | A1 | 10/2009 | Shimizu et al. | |
| 2009/0259401 | A1 | 10/2009 | Edwards et al. | |
| 2009/0276705 | A1 | 11/2009 | Ozdemir et al. | |
| 2009/0309757 | A1 | 12/2009 | Mudalige et al. | |
| 2010/0042304 | A1 | 2/2010 | Naik et al. | |
| 2010/0063735 | A1 | 3/2010 | Kindo et al. | |

FOREIGN PATENT DOCUMENTS

| | | |
|---|---|---|
| JP | 2003-044994 A | 2/2003 |
| JP | 2005 202922 | 7/2007 |
| JP | 2007-233765 A | 9/2007 |
| JP | 2007 249364 | 9/2007 |
| JP | 4062353 | 3/2008 |
| JP | 2008-213699 A | 9/2008 |
| JP | 2009-251953 A | 10/2009 |

OTHER PUBLICATIONS

Office Action mailed Nov. 27, 2023, in co-pending U.S. Appl. No. 17/453,796.
Notice of Allowance mailed Jan. 26, 2024, in co-pending U.S. Appl. No. 17/453,775.
United States Notice of Allowance issued Apr. 5, 2024 in U.S. Appl. No. 17/453,796, 10 pages.
Notice of Allowance mailed Dec. 9, 2022, in U.S. Appl. No. 15/293,674.
Advisory Action issued Jun. 20, 2022 in U.S. Appl. No. 15/293,674 4 pgs.
Office Action mailed Apr. 7, 2022 in U.S. Appl. No. 15/293,674, 15 pages.
Vacek et al, "Using case-based reasoning for autonomous vehicle guidance", Proceedings of the 2007 IEEE/RSJ International Conference on Intelligent Robots and Systems San Diego, CA, USA, Oct. 29-Nov. 2, 2007.
Krips et al, "AdTM tracking for blind spot collision avoidance", 2004 IEEE Intelligent Vehicles Symposium University of Parma Parma, Italy Jun. 14-17, 2004.
Aufrere et al, "Perception for collision avoidance and autonomous driving", Mechatronics 13 (2003) 1149-1161, 2003 Elsevier Ltd.
Bevly et al, "Autonomous Car for the Urban Challenge", SciAutonics, LLC and Auburn University College of Engineering, Date: Jun. 1, 2007, for the Urban Challenge (UC) in Nov. 2007.
Bourbakis et al, "Smart Cars as Autonomous Intelligent Agents", Proceedings of the 13th International Conference on Tools with Artificial Intelligence, pp. 25-32, Date of Conference: Nov. 7-9, 2001.
Bouroche et al, "Real-Time Coordination of Autonomous Vehicles", Proceedings of the IEEE ITSC 2006 2006 IEEE Intelligent Transportation Systems Conference Toronto, Canada, Sep. 17-20, 2006.
Dao et al, "Markov-Based Lane Positioning Using Intervehicle Communication", IEEE Transactions on Intelligent Transportation Systems, vol. 8, No. 4, Dec. 2007.
Eidehall et al, "Toward Autonomous Collision Avoidance by Steering", IEEE Transactions on Intelligent Transportation Systems, vol. 8, No. 1, Mar. 2007.
Eidehall, "Tracking and threat assessment for automotive collision avoidance", Linkoping Studies in Science and Technology. Dissertations, No. 1066, Department of Electrical Engineering Linkopings universitet, SE-581 83 Linkoping, Sweden Linkoping 2007.
Fax et al, "Information Flow and Cooperative Control of Vehicle Formations", IEEE Transactions on Automatic Control, vol. 49, No. 9, Sep. 2004.
Ferguson et al, "Detection, Prediction, and Avoidance of Dynamic Obstacles in Urban Environments", 2008 IEEE Intelligent Vehicles Symposium Eindhoven University of Technology Eindhoven, The Netherlands, Jun. 4-6, 2008.
Kuchar et al, "The Traffic Alert and Collision Avoidance System", vol. 16, No. 2, 2007, Lincoln Laboratory Journal.
Mandiau et al, "Behaviour based on decision matrices for a coordination between agents in a urban traffic simulation", Applied Intelligence, 28, pp. 121-138, 2008.
Mclurkin, "Stupid Robot Tricks: a Behavior-Based Distributed Algorithm Library for Programming Swarms of Robots", Massachusetts Institute of Technology, May 2004.
Misener et al, "Cooperative Collision Warning: Enabling Crash Avoidance with Wireless Technology", 12th World Congress on ITS, Nov. 6-10, 2005, San Francisco.
Salvucci, "Modeling Driver Behavior in a Cognitive Architecture", vol. 48, No. 2, Summer 2006, pp. 362-380, Human Factors and Ergonomics Society.
Urmson et al, "Autonomous Driving in Urban Environments: Boss and the Urban Challenge", Journal of Field Robotics 25(8), 425-466 (2008), 2008 Wiley Periodicals, Inc.
Wardzinski, "Dynamic Risk Assessment in Autonomous Vehicle Motion Planning", IEEE, 1st International Conference on Information Technology, Gdansk, May 18-21, 2008.
Wu et al, "A New Vehicle Detection with Distance Estimation for Lane Change Warning Systems", Proceedings of the 2007 IEEE Intelligent Vehicles Symposium Istanbul, Turkey, Jun. 13-15, 2007.
International Search Report Issued Sep. 27, 2010 in PCT/JP10/057779 Filed Apr. 26, 2010.
Japanese Office Action Issued Sep. 27, 2011 in Japanese Patent Application No. 2009-120015 Filed May 18, 2009 (with partial English translation).
Vacek et al., "Using case-based reasoning for autonomous vehicle guidance", Proceedings of the 2007 IEEE/RSJ International Conference on Intelligent Robots and Systems San Diego, CA, USA, Oct. 29-Nov. 2, 2007 (Year: 2007).
Kohl, Nate, Kenneth Stanley, Risto Miikkulainen, Michael Samples, and Rini Sherony. "Evolving a real-world vehicle warning system." In Proceedings of the 8th annual conference on Genetic and evolutionary computation, pp. 1681-1688. 2006. (Year: 2006).

* cited by examiner

Fig.9

| DETECTED OBSTACLE NUMBER / STATE OF UNDETECTED OBSTACLE | B1 | B2 | B3 | B4 | ... | N |
|---|---|---|---|---|---|---|
| C1 | 0.3 | 0.4 | 0.4 | 0.3 | | 0.2 |
| C2 | 0.4 | 0.2 | 0.1 | 0.5 | | 0.3 |
| C3 | 0.9 | 0.8 | 0.2 | 0.7 | | 0.9 |
| C4 | 0.3 | 0.2 | 0.3 | 0.4 | | 0.2 |
| ⋮ | | | | | | |

VEHICULAR ENVIRONMENT ESTIMATION DEVICE

CROSS-REFERENCE TO RELATED APPLICATIONS

The present application is a continuation of U.S. application Ser. No. 17/453,796, filed Nov. 5, 2021, which is a continuation of U.S. application Ser. No. 15/293,674, filed Oct. 14, 2016, which is a continuation of U.S. application Ser. No. 13/320,706, filed Nov. 15, 2011, the entire contents of which are incorporated herein by reference. U.S. application Ser. No. 13/320,706 is a national stage of International Application No. PCT/JP10/057779, filed Apr. 26, 2010, which is based upon and claims the benefit of priority to Japanese Patent Application No. 2009-120015 filed May 18, 2009.

TECHNICAL FIELD

The present invention relates to a vehicular environment estimation device that estimates an environmental state around a vehicle.

BACKGROUND ART

As described in Japanese Patent No. 4062353, a device for estimating an environmental state around a vehicle is known which stores the position or the like of an obstacle in the vicinity of the vehicle and predicts the route of the obstacle. This device finds routes, which interfere with each other, from among a plurality of predicted routes, and decreases the prediction probability of the routes which interfere with each other to predict the route of the obstacle.

CITATION LIST

Patent Literature

[PTL 1] Japanese Patent No. 4062353

SUMMARY OF INVENTION

Technical Problem

However, in the above-described device, there is a case where it is difficult to appropriately estimate the actual environmental state around the vehicle. For example, in predicting the route while detecting other vehicles by radar, it is difficult to predict the route of another vehicle, which is traveling in the blind area of the vehicle.

The invention has been finalized in order to solve such a problem, and an object of the invention is to provide a vehicular environment estimation device capable of accurately estimating the travel environment around own vehicle on the basis of a predicted route of a mobile object, which is moving in a blind area.

Solution to Problem

An aspect of the invention provides a vehicular environment estimation device. The vehicular environment estimation device includes a behavior detection means that detects a behavior of a mobile object in the vicinity of own vehicle, and an estimation means that estimates an environment, which affects the traveling of the mobile object, on the basis of the behavior of the mobile object.

With this configuration, the behavior of the mobile object in the vicinity of the own vehicle is detected, and the environment that affects the traveling of the mobile object is estimated on the basis of the behavior of the mobile object. Therefore, it is possible to estimate a vehicle travel environment that cannot be recognized from the own vehicle but can be recognized from a mobile object in the vicinity of the own vehicle.

The vehicular environment estimation device may further include a behavior prediction means that supposes the environment, which affects the traveling of the mobile object, and predicts the behavior of the mobile object on the basis of the supposed environmental state, and a comparison means that compares the behavior of the mobile object predicted by the behavior prediction means with the behavior of the mobile object detected by the behavior detection means. The estimation means may estimate the environment, which affects the traveling of the mobile object, on the basis of the comparison result of the comparison means.

With this configuration, the environment that affects the traveling of the mobile object is supposed, and the behavior of the mobile object is predicted on the basis of the supposed environmental state. Then, the predicted behavior of the mobile object is compared with the detected behavior of the mobile object, and the environment that affects the traveling of the mobile object is estimated on the basis of the comparison result. Therefore, it is possible to estimate a vehicle travel environment, which affects the traveling of the mobile object, on the basis of the detected behavior of the mobile object.

Another aspect of the invention provides a vehicular environment estimation device. The vehicular environment estimation device includes a behavior detection means that detects a behavior of a mobile object in the vicinity of own vehicle, and an estimation means that estimates an environment of a blind area of the own vehicle on the basis of the behavior of the mobile object.

With this configuration, the behavior of the mobile object in the vicinity of the own vehicle is detected, and the environment of the blind area of the own vehicle is estimated on the basis of the behavior of the mobile object. Therefore, it is possible to estimate the vehicle travel environment of the blind area that cannot be recognized from the own vehicle but can be recognized from the mobile object in the vicinity of the own vehicle.

The vehicular environment estimation device may further include a behavior prediction means that supposes the environment of the blind area of the own vehicle and predicts the behavior of the mobile object on the basis of the supposed environmental state, and a comparison means that compares the behavior of the mobile object predicted by the behavior prediction means with the behavior of the mobile object detected by the behavior detection means. The estimation means may estimate the environment of the blind area of the own vehicle on the basis of the comparison result of the comparison means.

With this configuration, the environment of the blind area of the own vehicle is supposed, and the behavior of the mobile object is predicted on the basis of the supposed environmental state. Then, the predicted behavior of the mobile object is compared with the detected behavior of the mobile object, and the environment of the blind area of the own vehicle is estimated on the basis of the comparison result. Therefore, it is possible to estimate the vehicle travel environment of the blind area of the own vehicle on the basis of the detected behavior of the mobile object.

In the vehicular environment estimation device, the estimation means may predict the behavior of the mobile object, which is present in the blind area, as the environment of the blind area of the own vehicle.

With this configuration, the behavior of the mobile object which is present in the blind area, is predicted as the environment of the blind area of the own vehicle. Therefore, it is possible to accurately predict the behavior of the mobile object which is present in the blind area of the own vehicle.

The vehicular environment estimation device may further include an abnormal behavior determination means that, when the behavior detection means detects a plurality of behaviors of the mobile objects, and the estimation means estimates the environment of the blind area of the own vehicle on the basis of the plurality of behaviors of the mobile objects, determines that a mobile object which does not behave in accordance with the estimated environment of the blind area of the own vehicle behaves abnormally.

With this configuration, when the environment of the blind area of the own vehicle is estimated on the basis of a plurality of behaviors of the mobile objects, it is determined that a mobile object which does not behave in accordance with the estimated environment of the blind area of the own vehicle behaves abnormally. Therefore, it is possible to specify a mobile object which behaves abnormally in accordance with the estimated environment of the blind area.

In the vehicular environment estimation device, the estimation means may estimate the display state of a traffic signal in front of the mobile object on the basis of the behavior of the mobile object as the environment, which affects the traveling of the mobile object, or the environment of the blind area of the own vehicle.

With this configuration, the display state of a traffic signal in front of the mobile object is estimated on the basis of the behavior of the mobile object. Therefore, it is possible to accurately estimate the display state of a traffic signal that cannot be recognized from the own vehicle but can be recognized from the mobile object in the vicinity of the own vehicle.

The vehicular environment estimation device may further include an assistance means that performs travel assistance for the own vehicle on the basis of the environment estimated by the estimation means.

Advantageous Effects of Invention

According to the aspects of the invention, it is possible to accurately estimate a travel environment around own vehicle on the basis of a predicted route of a mobile object or the like, which is moving in a blind area.

BRIEF DESCRIPTION OF DRAWINGS

FIG. 9 is an explanatory view of vehicular environment estimation processing during the operation of FIG. 7.

DESCRIPTION OF EMBODIMENTS

Figure 1:
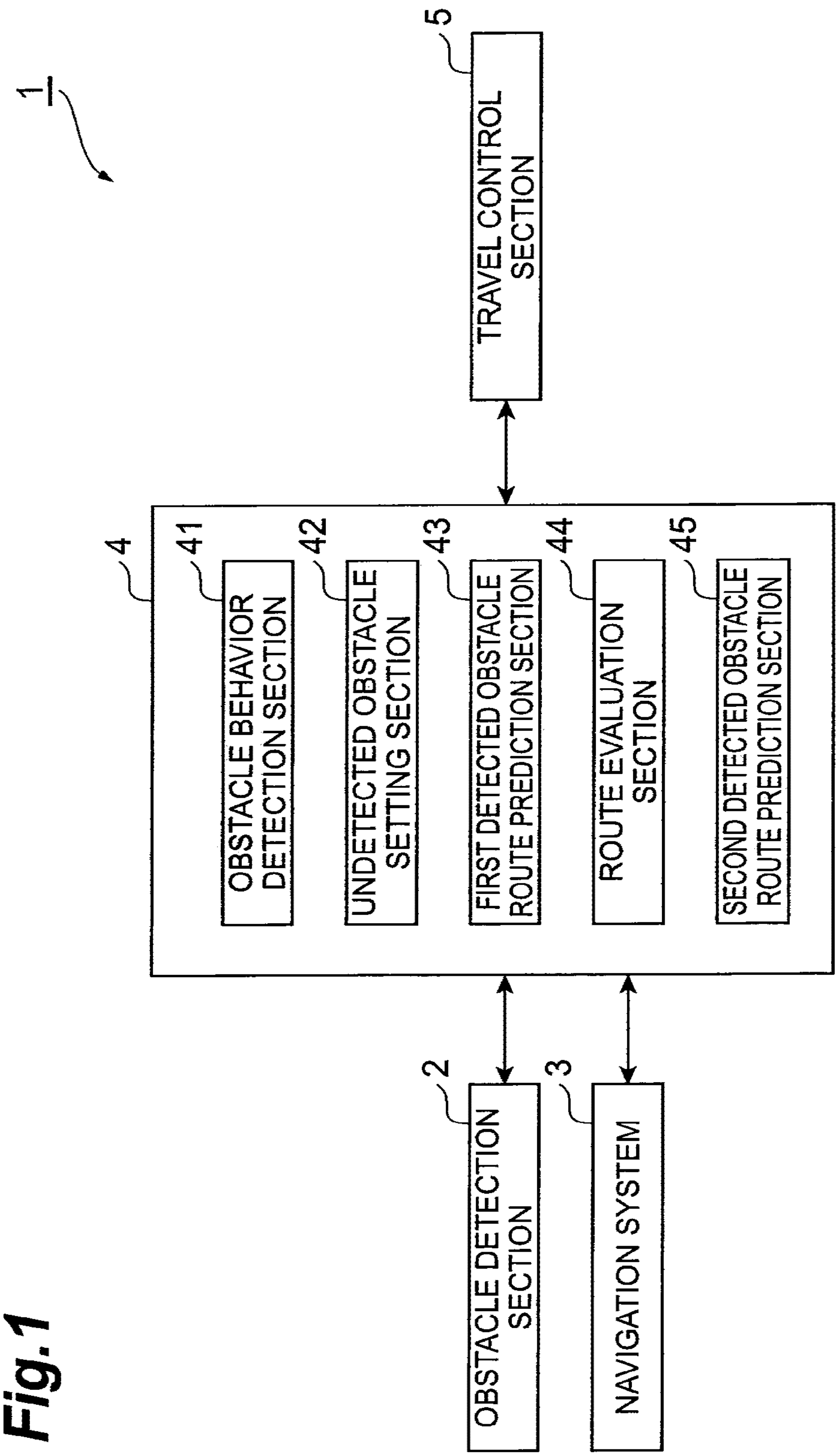
FIG. 1 is a diagram showing a configuration outline of a vehicular environment estimation device according to a first embodiment of the invention.

Hereinafter, embodiments of the invention will be described in detail with reference to the accompanying drawings. In the following description, the same parts are represented by the same reference numerals, and overlap descriptions will not be repeated.

First Embodiment

FIG. 1 is a schematic configuration diagram of a vehicular environment estimation device according to a first embodiment of the invention.

A vehicular environment estimation device 1 of this embodiment is a device that is mounted in own vehicle and estimates the travel environment of the vehicle, and is used for, for example, an automatic drive control system or a drive assistance system of a vehicle.

As shown in FIG. 1, the vehicular environment estimation device 1 of this embodiment includes an obstacle detection section 2. The obstacle detection section 2 is a detection sensor that detects an object in the vicinity of the own vehicle, and functions as a movement information acquisition means that acquires information regarding the movement of a mobile object in the vicinity of the own vehicle. For the obstacle detection section 2, for example, a millimeter wave radar, a laser radar, or a camera is used. Type information, position information, and relative speed information of a mobile object, such as another vehicle, can be acquired by a detection signal of the obstacle detection section 2.

The vehicular environment estimation device 1 includes a navigation system 3. The navigation system 3 functions as a position information acquisition means that acquires position information of the own vehicle. For the navigation system 3, a system is used which has a GPS (Global Positioning System) receiver and stores map data therein.

The vehicular environment estimation device 1 includes an ECU (Electronic Control Unit) 4. The ECU 4 controls the entire device, and is primarily formed by a computer having a CPU, a ROM, and a RAM. The ECU 4 includes an obstacle behavior detection section 41, an undetected obstacle setting section 42, a first detected obstacle route prediction section 43, a route evaluation section 44, and a second detected obstacle route prediction section 45. The obstacle behavior detection section 41, the undetected obstacle setting section 42, the first detected obstacle route prediction section 43, the route evaluation section 44, and the second detected obstacle route prediction section 45 may be configured to be executed by programs which are stored in the ECU 4 or may be provided in the ECU 4 as separate units.

The obstacle behavior detection section 41 functions as a behavior detection means that detects a behavior of a mobile object in the vicinity of the own vehicle on the basis of a detection signal of the obstacle detection section 2. For example, the position of another vehicle in the vicinity of the own vehicle is stored and recognized or a transition of the position of another vehicle is recognized on the basis of the detection signal of the obstacle detection section 2.

The undetected obstacle setting section 42 supposes a plurality of travel environments which have different settings regarding the presence/absence of undetected obstacles, the number of undetected obstacles, the states of undetected obstacles, and the like, and functions as an undetected obstacle setting means that sets the presence/absence of an undetected obstacle in a blind area where the own vehicle cannot recognize an obstacle. For example, the undetected obstacle setting section 42 sets presence of another vehicle supposing that, at an intersection, another undetected vehicle is present in the blind area where the own vehicle cannot detect an obstacle, or supposes that another undetected vehicle is not present in the blind area. At this time, with regard to the attributes, such as the number of obstacles in the blind area, the position and speed of each obstacle, and the like, a plurality of hypotheses are set.

The first detected obstacle route prediction section 43 predicts the routes (first predicted routes) of a detected obstacle corresponding to a plurality of suppositions by the undetected obstacle setting section 42. The first detected obstacle route prediction section 43 functions as a behavior prediction means that supposes the environment, which affects the traveling of a detected mobile object, or the environment of the blind area of the own vehicle, and supposes or predicts the behavior or route of the mobile object on the basis of the supposed environmental state. For example, when it is supposed that an undetected obstacle is present, in each of the environments where the undetected obstacle is present, the route of the mobile object detected by the obstacle behavior detection section 41 is predicted. At this time, when it is supposed that a plurality of undetected obstacles are present, for the supposition on presence of each undetected obstacle, route prediction of a mobile object is carried out.

The route evaluation section 44 evaluates the route of the detected obstacle predicted by the first detected obstacle route prediction section 43. The route evaluation section 44 compares the behavior detection result of the detected obstacle detected by the obstacle behavior detection section 41 with the route prediction result of the detected obstacle predicted by the first detected obstacle route prediction section 43 to estimate a travel environment. The route evaluation section 44 functions as a comparison means that compares the behavior or route of the mobile object predicted by the first detected obstacle route prediction section 43 with the behavior of the mobile object detected by the obstacle behavior detection section 41. The route evaluation section 44 also functions as an estimation means that estimates the environment, which affects the traveling of the mobile object, or the environment of the blind area of the own vehicle on the basis of the comparison result.

The second detected obstacle route prediction section 45 is a route prediction means that predicts the route of a mobile object detected by the obstacle behavior detection section 41. For example, the route (second predicted route) of the mobile object detected by the obstacle behavior detection section 41 is predicted on the basis of the evaluation result of the route evaluation section 44.

The vehicular environment estimation device 1 includes a travel control section 5. The travel control section 5 controls the traveling of the own vehicle in accordance with a control signal output from the ECU 4. For example, an engine control ECU, a brake control ECU, and a steering control ECU correspond to the travel control section 5.

Next, the operation of the vehicular environment estimation device 1 of this embodiment will be described.

Figure 2:
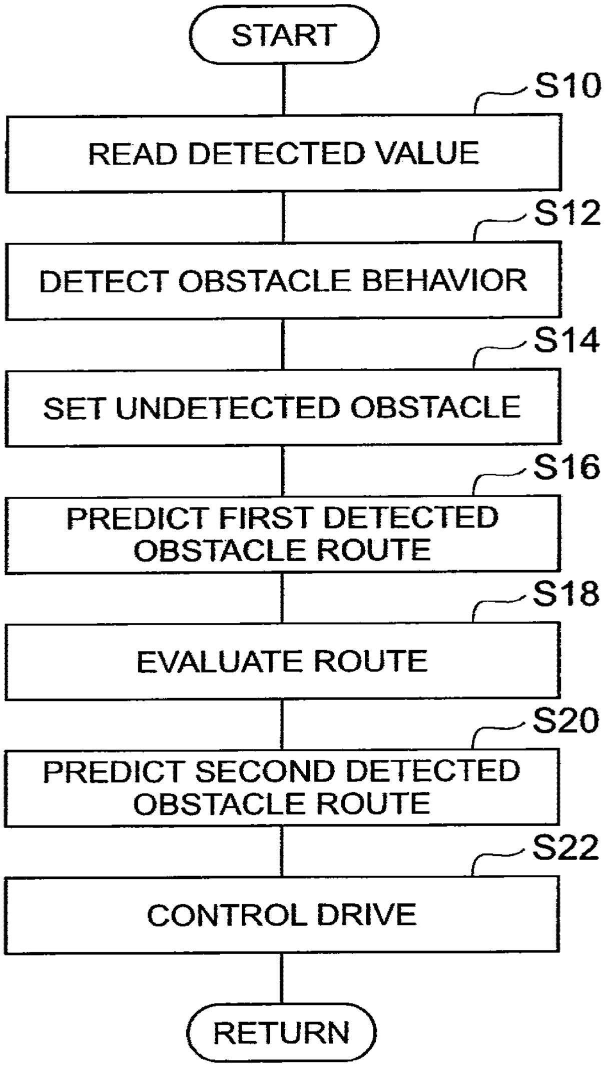
FIG. 2 is a flowchart showing an operation of the vehicular environment estimation device of FIG. 1.
Figure 3:
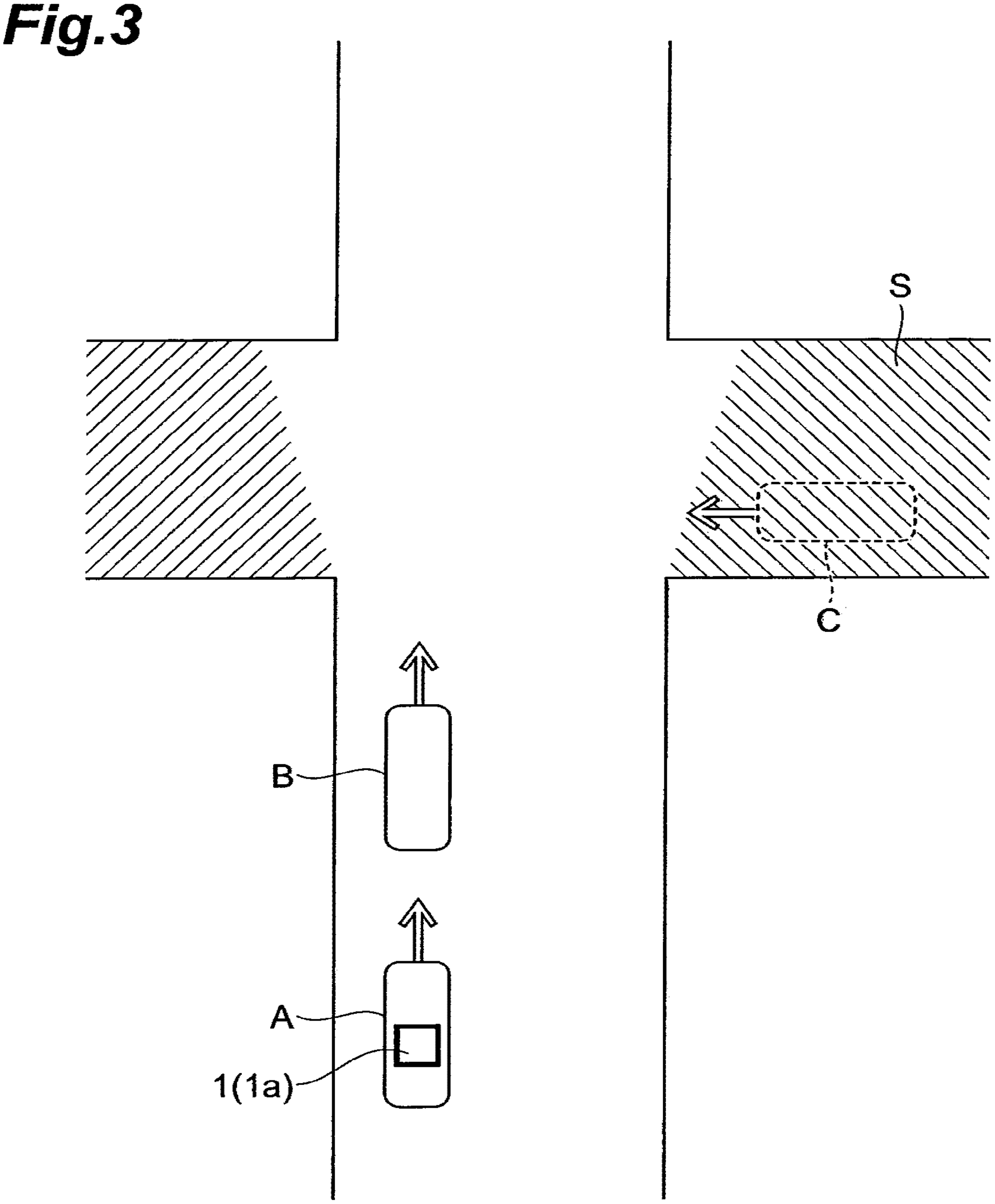
FIG. 3 is an explanatory view of vehicular environment estimation processing during the operation of FIG. 2.

FIG. 2 is a flowchart showing the operation of the vehicular environment estimation device 1 of this embodiment. The flowchart of FIG. 2 is executed repeatedly in a predetermined cycle by the ECU 4, for example. FIG. 3 is a plan view of a road for explaining the operation of the vehicular environment estimation device 1. FIG. 3 shows a case where own vehicle A estimates a vehicle travel environment on the basis of the behavior of a preceding vehicle B. The vehicular environment estimation device 1 is mounted in the own vehicle A.

First, as shown in Step S10 (Hereinafter, Step S10 is simply referred to as "S10". The same is applied to the steps subsequent to Step S10) of FIG. 2, detected value reading processing is carried out. This processing is carried out to read a detected value of the obstacle detection section 2 and a detected value regarding the own vehicle position of the navigation system 3.

Next, the process progresses to S12, and obstacle behavior detection processing is carried out. The obstacle behavior detection processing is carried out to detect the behavior of an obstacle or a mobile object, such as another vehicle, on the basis of the detection signal of the obstacle detection section 2. For example, as shown in FIG. 3, the vehicle B is detected by the obstacle detection section 2, and the position of the vehicle B is tracked, such that the behavior of the vehicle B is detected.

Next, the process progresses to S14 of FIG. 2, and undetected obstacle setting processing is carried out. The undetected obstacle setting processing is carried out to suppose a plurality of travel environments which have different settings regarding the presence/absence of undetected obstacles, the number of undetected obstacles, the states of undetected obstacles, and the like. During the undetected obstacle setting processing, the presence/absence of an obstacle which cannot be detected by the obstacle detection section 2 is supposed and an undetectable obstacle is set in a predetermined region. For example, an undetected obstacle is set in the blind area of the own vehicle. At this time, the number of obstacles in the blind area, and the position, speed, and travel direction of each obstacle are appropriately set.

Specifically, as shown in FIG. 3, a mobile object C is set in a blind area S, which cannot be detected from the own vehicle A but can be detected from the vehicle B, as an undetected obstacle. At this time, it is preferable that, assuming various traffic situations, a plurality of mobile objects are set as undetected obstacles.

Next, the process progresses to S16 of FIG. 2, and first detected obstacle route prediction processing is carried out. The first detected obstacle route prediction processing is carried out to predict the routes (first predicted routes) of a detected obstacle corresponding to a plurality of suppositions by the undetected obstacle setting processing of S14. For example, the behavior or route of the mobile object is predicted on the basis of the travel environment, which is supposed through S14.

For example, as shown in FIG. 3, when it is supposed that the mobile object C in the blind area S is moving toward an intersection, the route of the vehicle B is predicted on the basis of the supposed state. The term "route" used herein indicates the speed of the vehicle B as well as the travel path of the vehicle B. A plurality of different routes of the vehicle B are predicted.

Next, the process progresses to S18 of FIG. 2, and route evaluation processing is carried out. The route evaluation processing is carried out to evaluate the routes of the detected obstacle predicted by the first detected obstacle route prediction processing of S16. During the route evaluation processing, the behavior detection result of the detected obstacle detected by the obstacle behavior detection processing of S12 is compared with the route prediction result of the detected obstacle predicted by the first detected obstacle route prediction processing of S16, thereby estimating the travel environment.

For example, the route of the vehicle B predicted by the first detected obstacle route prediction processing of S16 is compared with the route of the vehicle B detected by the obstacle behavior detection processing of S12. A high evaluation is provided when the route of the vehicle B predicted by the first detected obstacle route prediction processing of S16 is closer to the route of the vehicle B detected by the obstacle behavior detection processing of S12. Then, from among the routes of the vehicle B predicted by the first detected obstacle route prediction processing of S16, a route which is closest to the route of the vehicle B detected by the obstacle behavior detection processing of S12 is selected as a predicted route. The vehicle travel environment, which affects the traveling of the vehicle B, or the vehicle travel environment of the blind area S of the own vehicle A is estimated on the basis of the selected predicted route of the vehicle B. For example, when a route on which the vehicle B travels in a straight line and reduces speed is predicted as the predicted route of the vehicle B, it is estimated that the vehicle C which is traveling toward the intersection is present in the blind area S.

Next, the process progresses to S20 of FIG. 2, and second detected obstacle route prediction processing is carried out. The second detected obstacle route prediction processing is carried out to predict the route of the mobile object detected by the obstacle behavior detection processing of S12. For example, the route (second predicted route) of the mobile object detected by the obstacle behavior detection processing of S12 is predicted on the basis of the evaluation result by the route evaluation processing of S18.

For example, referring to FIG. 3, the route of the vehicle B is predicted on the basis of the vehicle travel environment of the blind area S. When it is estimated that the vehicle C is not present in the blind area S, route prediction that the vehicle B is traveling without reducing speed is made on the basis of the estimation result. Meanwhile, when it is estimated that the vehicle C is present in the blind area S, route prediction that the vehicle B reduces speed is made on the basis of the estimation result.

Next, the process progresses to S22 of FIG. 2, and drive control processing is carried out. The drive control processing is carried out to perform drive control of the own vehicle. Drive control is executed in accordance with the result of detected obstacle route prediction of S20. For example, referring to FIG. 3, when it is predicted that the preceding vehicle B reduces speed, drive control is executed such that the own vehicle A does not increase speed or reduces speed. Meanwhile, when it is predicted that the preceding vehicle B is traveling at the current speed without reducing speed, drive control is executed in which the speed of the vehicle A is set such that the own vehicle A follows the vehicle B. After the drive control processing of S22 ends, a sequence of control processing ends.

As described above, according to the vehicular environment estimation device 1 of this embodiment, the behavior of the vehicle B in the vicinity of the own vehicle A is detected, and the environment which affects the traveling of the vehicle B is estimated on the basis of the behavior of the vehicle B. Therefore, it is possible to estimate the vehicle travel environment that cannot be recognized from the own vehicle A but can be recognized from the vehicle B in the vicinity of the own vehicle.

As described above, the environment which affects the traveling of the vehicle B is estimated, instead of the environment which directly affects the own vehicle A. Therefore, it is possible to predict the route of the vehicle B and to predict changes in the vehicle travel environment of the own vehicle A in advance, thereby carrying out safe and smooth drive control.

In the vehicular environment estimation device 1 of this embodiment, the environment which affects the traveling of the vehicle B is supposed, and the behavior of the vehicle B is predicted on the basis of the supposed environmental state. The predicted behavior of the vehicle B is compared with the detected behavior of the vehicle B, and the environment which affects the traveling of the vehicle B is estimated on the basis of the comparison result. Therefore, it is possible to estimate the vehicle travel environment, which affects the traveling of the vehicle B, on the basis of the behavior of the vehicle B.

According to the vehicular environment estimation device 1 of this embodiment, the behavior of the vehicle B in the vicinity of the own vehicle A is detected, and the environment of the blind area S of the own vehicle A is estimated on the basis of the behavior of the vehicle B. Therefore, it is possible to estimate the vehicle travel environment of the blind area S that cannot be recognized from the own vehicle A but can be recognized from the vehicle B in the vicinity of the own vehicle.

In the vehicular environment estimation device 1 of this embodiment, the environment of the blind area S of the own vehicle A is supposed, and the behavior of the vehicle B is predicted on the basis of the supposed environmental state. The predicted behavior of the vehicle B is compared with the detected behavior of the vehicle B, and the environment of the blind area S of the own vehicle A is estimated on the basis of the comparison result. Therefore, it is possible to estimate the vehicle travel environment of the blind area S of the own vehicle A on the basis of the detected behavior of the vehicle B.

Second Embodiment

Next, a vehicular environment estimation device according to a second embodiment of the invention will be described.

Figure 4:
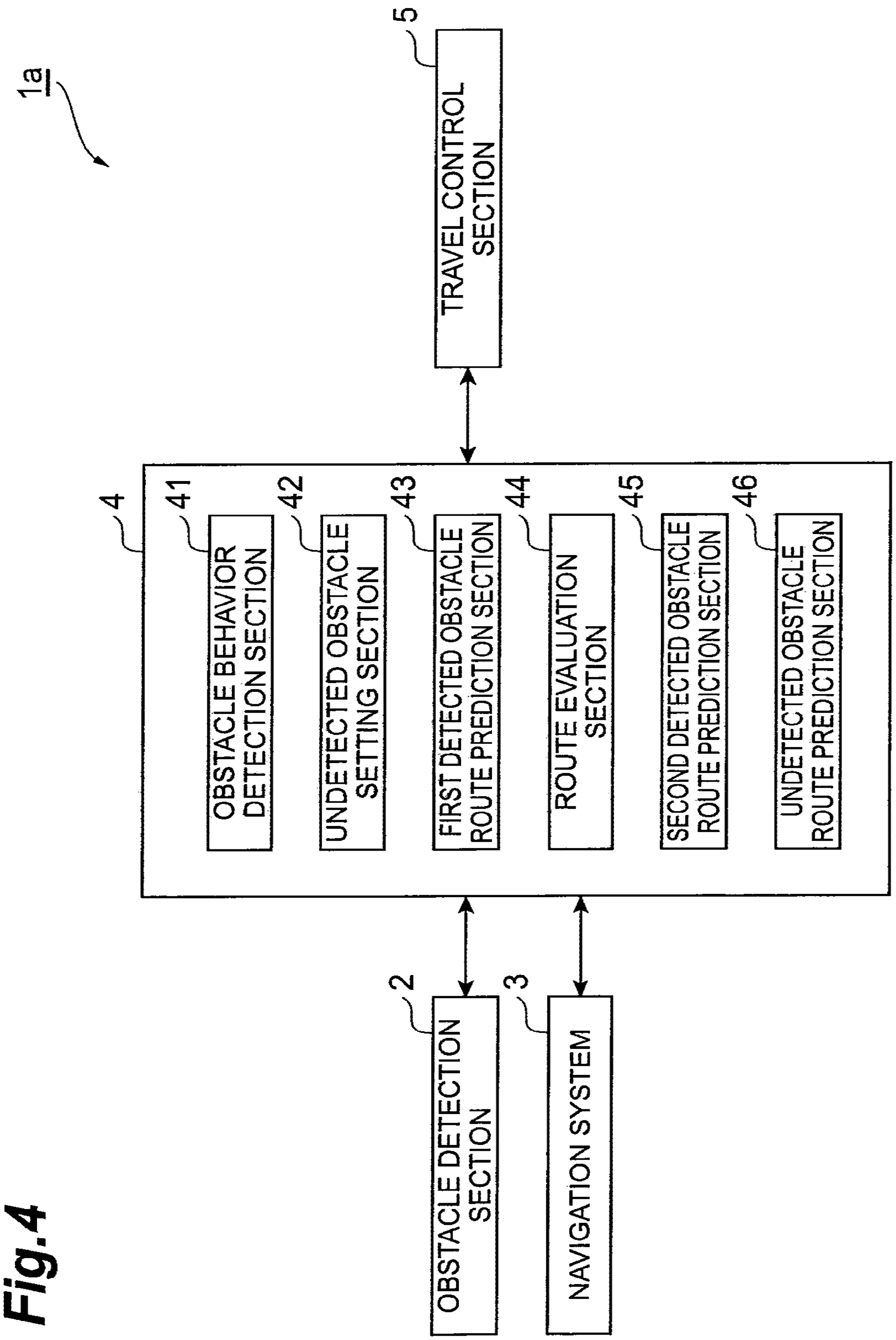
FIG. 4 is a diagram showing a configuration outline of a vehicular environment estimation device according to a second embodiment of the invention.

FIG. 4 is a schematic configuration diagram of a vehicular environment estimation device according to this embodiment.

A vehicular environment estimation device 1*a* of this embodiment is a device that is mounted in own vehicle and estimates the travel environment of the vehicle. The vehicular environment estimation device 1*a* substantially includes the same configuration as the vehicular environment estimation device 1 of the first embodiment, and is different from the vehicular environment estimation device 1 of the first embodiment in that an undetected obstacle route prediction section 46 is provided.

The ECU 4 includes an undetected obstacle route prediction section 46. The undetected obstacle route prediction section 46 may be configured to be executed by a program stored in the ECU 4, or may be provided as a separate unit from the obstacle behavior detection section 41 and the like in the ECU 4.

The undetected obstacle route prediction section 46 predicts a route of an undetected obstacle that cannot be directly detected by the obstacle detection section 2. For example, the undetected obstacle route prediction section 46 predicts a behavior of a mobile object, which is present in the blind area, on the basis of the environment of the blind area of the own vehicle. The route prediction result of an undetected obstacle, such as a mobile object, is used for drive control of the vehicle.

Next, the operation of the vehicular environment estimation device 1*a* of this embodiment will be described.

Figure 5:
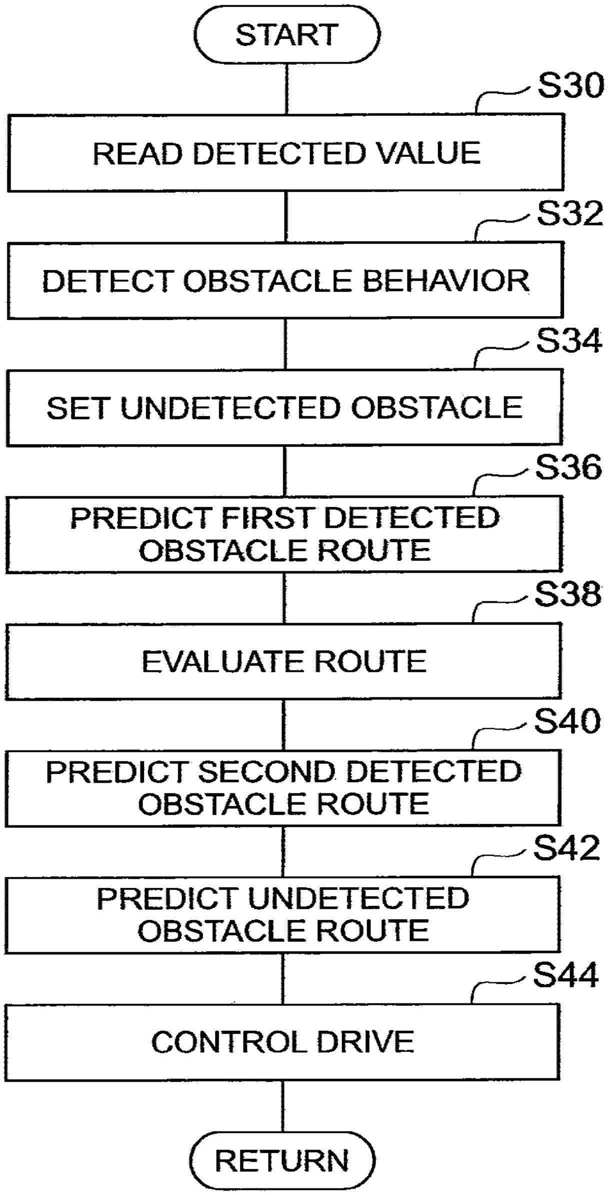
FIG. 5 is a flowchart showing an operation of the vehicular environment estimation device of FIG. 4.

FIG. 5 is a flowchart showing the operation of the vehicular environment estimation device 1*a* of this embodiment. The flowchart of FIG. 5 is executed repeatedly in a predetermined cycle by the ECU 4, for example.

First, as shown in S30 of FIG. 5, detected value reading processing is carried out. This processing is carried out to read a detected value of the obstacle detection section 2 and a detected value regarding the own vehicle position of the navigation system 3.

Next, the process progresses to S32, and obstacle behavior detection processing is carried out. The obstacle behavior detection processing is carried out to detect the behavior of an obstacle or a mobile object, such as another vehicle, on the basis of the detection signal of the obstacle detection section 2. The obstacle behavior detection processing is carried out in the same manner as S12 of FIG. 2.

Next, the process progresses to S34, and undetected obstacle setting processing is carried out. The undetected obstacle setting processing is carried out to suppose a plurality of travel environments which have different settings regarding the presence/absence of undetected obstacles, the number of undetected obstacles, the states of undetected obstacles, and the like. During the undetected obstacle setting processing, the presence/absence of an obstacle which cannot be detected by the obstacle detection section 2 is supposed, and an undetectable obstacle is set in a predetermined region. The undetected obstacle setting processing is carried out in the same manner as S14 of FIG. 2.

Next, the process progresses to S36, and first detected obstacle route prediction processing is carried out. The first detected obstacle route prediction processing is carried out to predict the routes (first predicted routes) of a detected obstacle corresponding to a plurality of suppositions by the undetected obstacle setting processing of S34. During the first detected obstacle route prediction processing, the behavior or route of a mobile object is predicted on the basis of the travel environment, which is supposed through S34. The first detected obstacle route prediction processing is carried out in the same manner as S16 of FIG. 2.

Next, the process progresses to S38, and route evaluation processing is carried out. The route evaluation processing is carried out to evaluate the routes of the detected obstacle predicted by the first detected obstacle route prediction processing of S36. During the route evaluation processing, the behavior detection result of the detected obstacle detected by the obstacle behavior detection processing of S32 is compared with the route prediction result of the detected obstacle predicted by the first detected obstacle route prediction processing of S36, thereby estimating the travel environment. The route evaluation processing is carried out in the same manner as S18 of FIG. 2.

Next, the process progresses to S40, and second detected obstacle route prediction processing is carried out. The second detected obstacle route prediction processing is carried out to predict the route of the mobile object detected by the obstacle behavior detection processing of S32. During the second detected obstacle route prediction processing, the route (second predicted route) of the mobile object detected by the obstacle behavior detection processing of S32 is predicted on the basis of the evaluation result by the route evaluation processing of S38. The second detected obstacle route prediction processing is carried out in the same manner as S20 of FIG. 2.

Next, the process progresses to S42, and undetected obstacle route prediction processing is carried out. The undetected obstacle route prediction processing is carried out to predict the route of an undetected obstacle. During the undetected obstacle route prediction processing, for example, the route of an undetected obstacle is predicted on the basis of the predicted route of the obstacle predicted by the second detected obstacle route prediction processing of S40.

For example, as shown in FIG. 3, when the vehicular environment estimation device 1*a* mounted in the vehicle A predicts the route of the vehicle C, which is an undetected obstacle, the route of the vehicle C is predicted on the basis of the predicted route of the vehicle B, which is a detected obstacle. During the route evaluation processing of S38, when the vehicle B tends to reduce speed on the predicted route of the vehicle B, to which a high evaluation is provided, it is estimated that the vehicle C, which is an undetected obstacle, is present. Then, during the undetected obstacle route prediction processing of S42, the route of the vehicle C is predicted on which the vehicle C enters the intersection and passes in front of the vehicle B. Meanwhile, during the route evaluation processing of S38, when the vehicle B tends to travel without reducing speed on the predicted route of the vehicle B, to which a high evaluation is provided, it is estimated that the vehicle C is not present. In this case, it is preferable that the undetected obstacle route prediction processing of S42 is not carried out, and the process progresses to S44.

Next, the process progresses to S44 of FIG. 5, and drive control processing is carried out. The drive control processing is carried out to perform drive control of the own vehicle. Drive control is executed in accordance with the result of detected obstacle route prediction of S40. The drive control processing is carried out in the same manner as S22 of FIG. 2. After the drive control processing of S44 ends, a sequence of control processing ends.

As described above, according to the vehicular environment estimation device 1*a* of this embodiment, in addition to the advantages of the vehicular environment estimation device 1, it is possible to accurately predict the behavior of a mobile object, which is in the blind area S, as the environment of the blind area S of the own vehicle A.

Third Embodiment

Next, a vehicular environment estimation device according to a third embodiment of the invention will be described.

Figure 6:
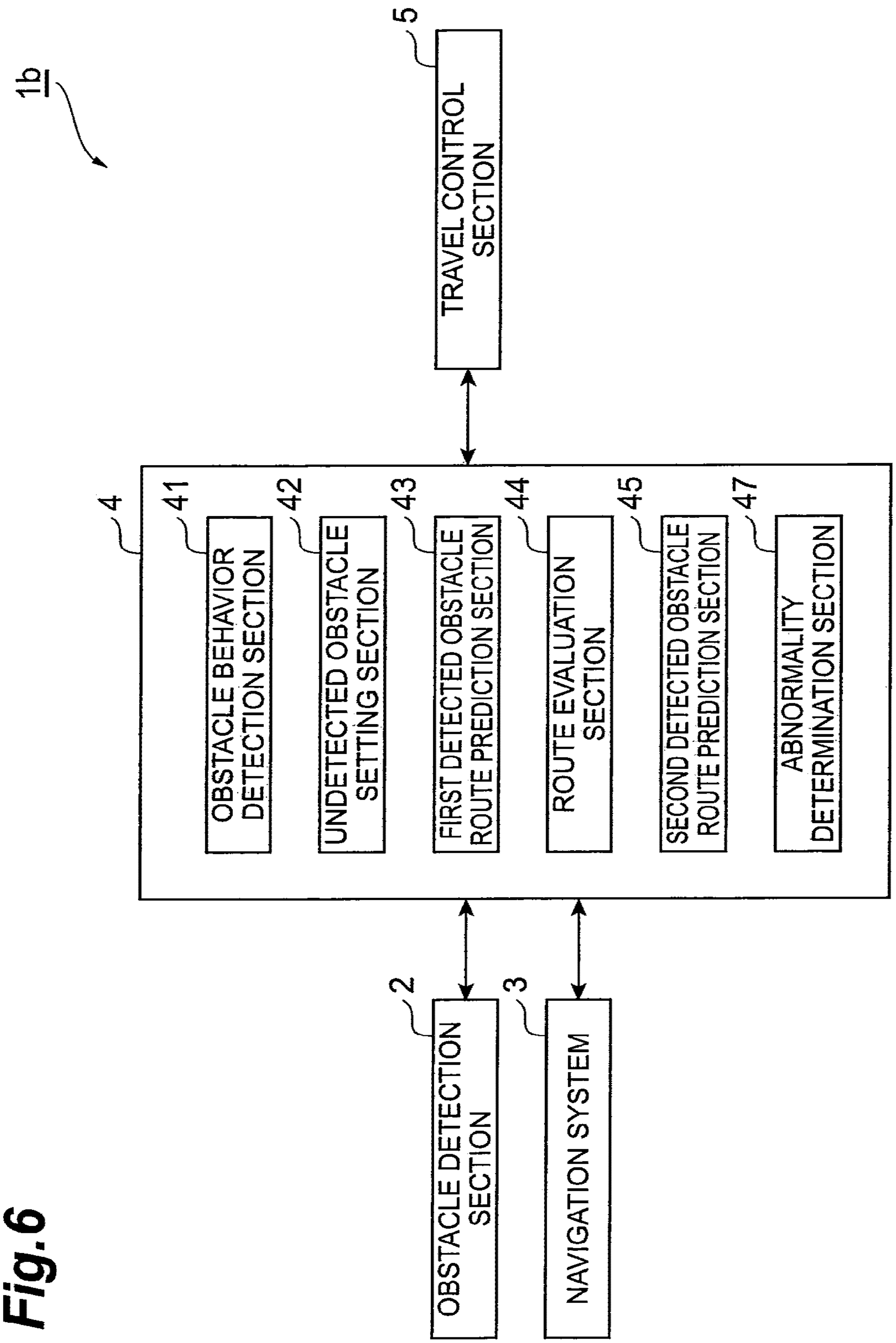
FIG. 6 is a diagram showing a configuration outline of a vehicular environment estimation device according to a third embodiment of the invention.

FIG. 6 is a schematic configuration diagram of a vehicular environment estimation device of this embodiment.

A vehicular environment estimation device 1*b* of this embodiment is a device that is mounted in own vehicle and estimates the travel environment of the vehicle. The vehicular environment estimation device 1*b* substantially includes the same configuration as the vehicular environment estimation device 1 of the first embodiment, and is different from the vehicular environment estimation device 1 of the first embodiment in that an abnormality determination section 47 is provided.

The ECU 4 includes an abnormality determination section 47. The abnormality determination section 47 may be configured to be executed by a program stored in the ECU 4, or may be provided as a separate unit from the obstacle behavior detection section 41 and the like in the ECU 4.

The abnormality determination section 47 determines whether the behavior of a detected obstacle which is directly detected by the obstacle detection section 2 is abnormal or not. For example, when a plurality of mobile objects are detected by the obstacle behavior detection section 41, the presence or route of an undetected obstacle which is present in the blind area is estimated on the basis of the behaviors of the mobile objects. At this time, when an undetected obstacle is recognized to be different from other mobile objects, it is determined that the behavior of the mobile object is abnormal.

Next, the operation of the vehicular environment estimation device 1*b* of this embodiment will be described.

Figure 7:
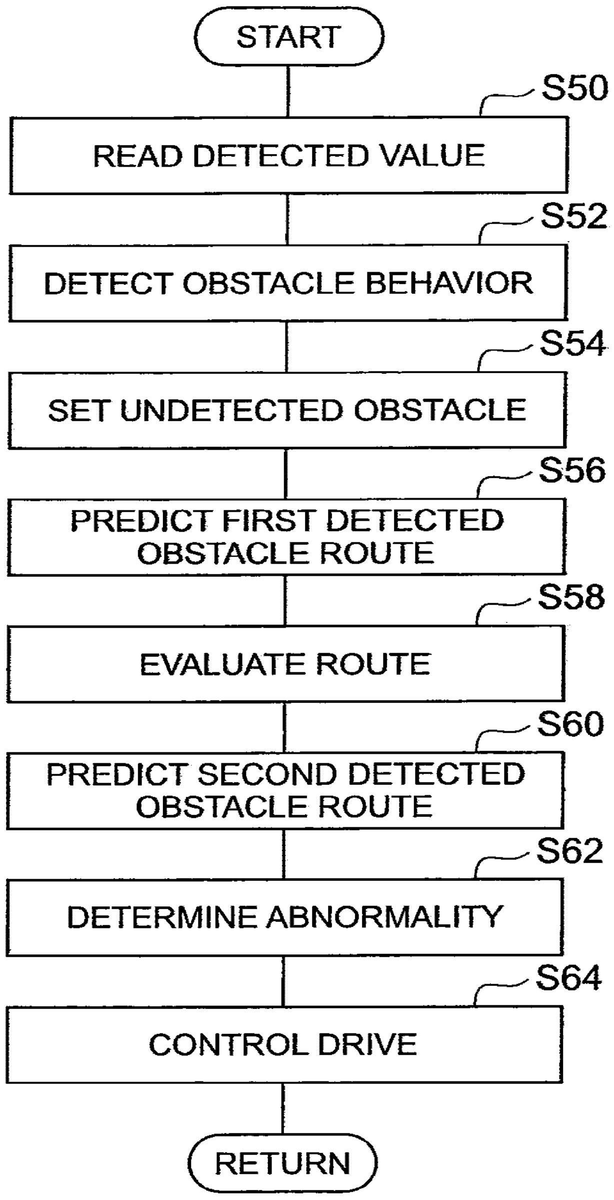
FIG. 7 is a flowchart showing an operation of the vehicular environment estimation device of FIG. 6.

FIG. 7 is a flowchart showing the operation of the vehicular environment estimation device 1*b* of this embodiment. The flowchart of FIG. 7 is executed repeatedly in a predetermined cycle by the ECU 4, for example.

First, as shown in S50 of FIG. 7, detected value reading processing is carried out. This processing is carried out to read a detected value of the obstacle detection section 2 and a detected value regarding the own vehicle position of the navigation system 3.

Figure 8:
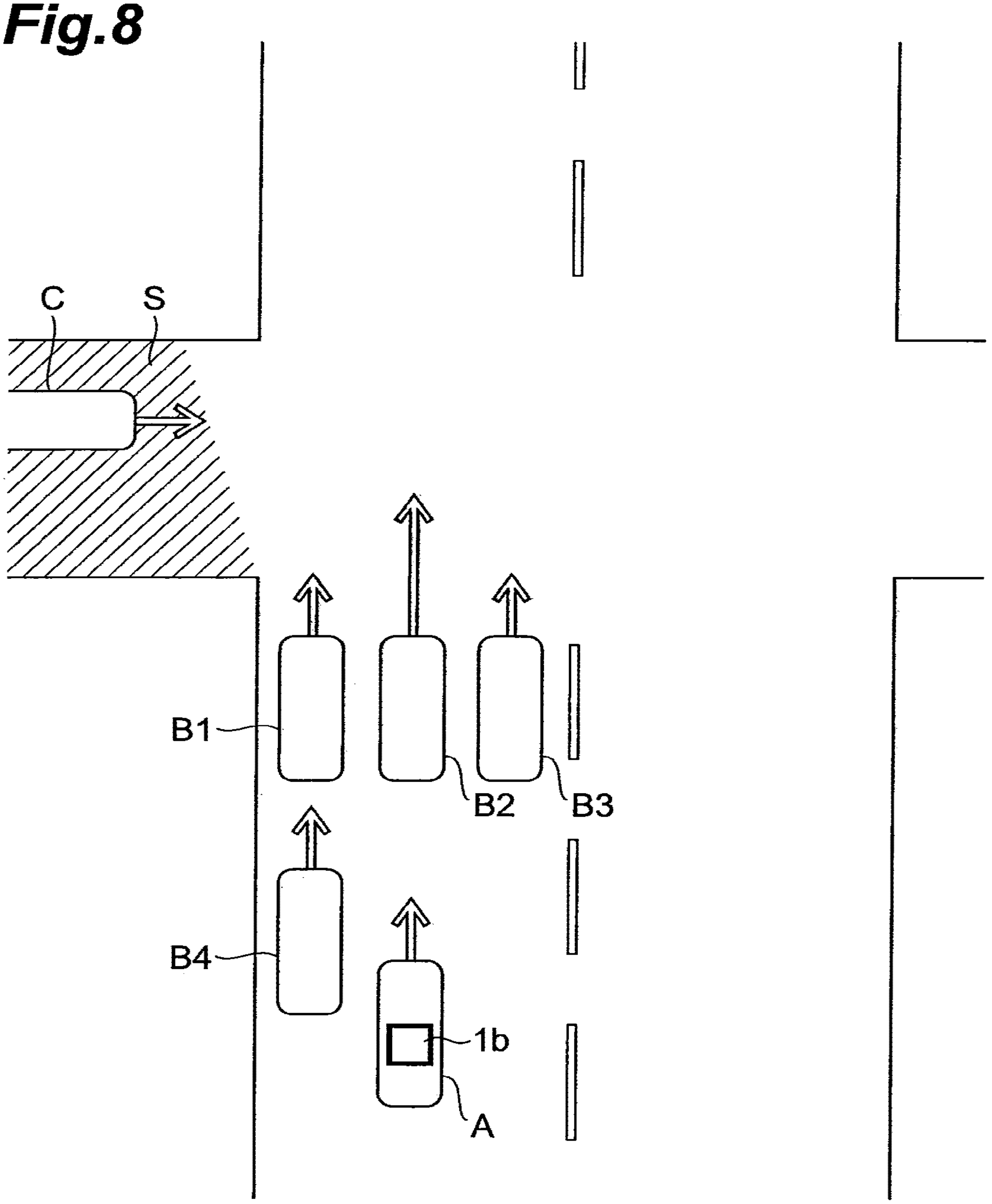
FIG. 8 is an explanatory view of vehicular environment estimation processing during the operation of FIG. 7.

Next, the process progresses to S52, and obstacle behavior detection processing is carried out. The obstacle behavior detection processing is carried out to detect the behavior of an obstacle or a mobile object, such as another vehicle, on the basis of the detection signal of the obstacle detection section 2. For example, as shown in FIG. 8, when a plurality of vehicles B1, B2, B3, and B4 are detected by the obstacle detection section 2, the positions of the vehicles B1 to B4 are tracked, such that the behaviors of the vehicles B1 to B4 are detected.

Next, the process progresses to S54, and undetected obstacle setting processing is carried out. The undetected obstacle setting processing is carried out to suppose a plurality of travel environments which have different settings regarding the presence/absence of undetected obstacles, the number of undetected obstacles, the states of undetected obstacles, and the like. During the undetected obstacle setting processing, the presence/absence of an obstacle which cannot be detected by the obstacle detection section 2 is supposed, and an undetectable obstacle is set in a predetermined region. The undetected obstacle setting processing is carried out in the same manner as S14 of FIG. 2. For example, as shown in FIG. 8, a mobile object C in the blind area S which cannot be detected from the own vehicle A but can be detected from the vehicles B1 to B4 is set as an undetected obstacle.

Next, the process progresses to S56, and first detected obstacle route prediction processing is carried out. The first detected obstacle route prediction processing is carried out to predict the routes (first predicted routes) of a detected obstacle corresponding to a plurality of suppositions by the undetected obstacle setting processing of S54. During the first detected obstacle route prediction processing, the behavior or route of a mobile object is predicted on the basis of the travel environment, which is supposed through S54. The first detected obstacle route prediction processing is carried out in the same manner as S16 of FIG. 2.

Next, the process progresses to S58, and route evaluation processing is carried out. The route evaluation processing is carried out to evaluate the routes of the detected obstacle predicted by the first detected obstacle route prediction processing of S56. During the route evaluation processing, the behavior detection result of the detected obstacle detected by the obstacle behavior detection processing of S52 is compared with the route prediction result of the detected obstacle predicted by the first detected obstacle route prediction processing of S56, thereby estimating the travel environment. The route evaluation processing is carried out in the same manner as S18 of FIG. 2.

Next, the process progresses to S60, and second detected obstacle route prediction processing is carried out. The second detected obstacle route prediction processing is carried out to predict the route of the mobile object detected by the obstacle behavior detection processing of S52. During the second detected obstacle route prediction processing, the route (second predicted route) of the mobile object detected by the obstacle behavior detection processing of S52 is predicted on the basis of the evaluation result by the route evaluation processing of S58. The second detected obstacle route prediction processing is carried out in the same manner as S20 of FIG. 2.

Next, the process progresses to S62, and abnormality determination processing is carried out. The abnormality determination processing is carried out to determine abnormality with respect to the behaviors of a plurality of obstacles detected in S52. For example, when a plurality of obstacles are detected by the obstacle behavior detection processing 52, if an undetected obstacle is recognized to be different from other mobile objects by a predetermined value or more, it is determined that the behavior of the mobile object is abnormal.

FIG. 9 shows the validity of the state of presence/absence of an undetected obstacle based on the behaviors of detected obstacles. FIG. 9 shows the values that, when a plurality of detected obstacles B1, B2, B3, B4, . . . are detected, and a plurality of undetected obstacles C1, C2, C3, C4, . . . are set, represent the validity of the presence/absence states of the undetected obstacles C1, C2, C3, C4, . . . based on the behaviors of the detected obstacles B1, B2, B3, B4, . . . . In FIG. 9, N indicates the average value of the values representing the validity of the undetected obstacles.

Referring to FIG. 9, while the validity of the value of the undetected obstacle C3 is high, the value of the detected obstacle B3 alone is low and it is determined that the value differs from the average value N by a predetermined value or more. In this case, it is determined that the behavior of the detected obstacle B3 is abnormal.

Next, the process progresses to S64 of FIG. 7, and drive control processing is carried out. The drive control processing is carried out to perform drive control of the own vehicle. Drive control is executed in accordance with the result of detected obstacle route prediction of S60. The drive control processing is carried out in the same manner as S22 of FIG. 2. In this case, it is preferable that drive control is carried out without taking into consideration information of a detected obstacle, which is determined to be abnormal, or while decreasing the weight of information of a detected obstacle, which is determined to be abnormal. It is preferable that, when a detected obstacle which is determined to be abnormal is present, drive control is carried out such that the vehicle is as far away as possible from the detected obstacle which is determined to be abnormal. It is preferable that, when a detected obstacle which is determined to be abnormal is present, notification or a warning is carried out such that the vehicle is as far away as possible from the detected obstacle which is determined to be abnormal. After the drive control processing of S64 ends, a sequence of control processing ends.

As described above, according to the vehicular environment estimation device 1*b* of this embodiment, in addition to the advantages of the vehicular environment estimation device 1 of the first embodiment, in estimating the environment of the blind area of the own vehicle on the basis of the behaviors of a plurality of detected obstacles, it is possible to determine that a detected obstacle which does not behave in accordance with the estimated environment of the blind area of the own vehicle behaves abnormally. That is, it is possible to specify a detected obstacle which abnormally behaves in accordance with the estimated environment of the blind area.

Fourth Embodiment

Next, a vehicular environment estimation device according to a fourth embodiment of the invention will be described.

Figure 10:
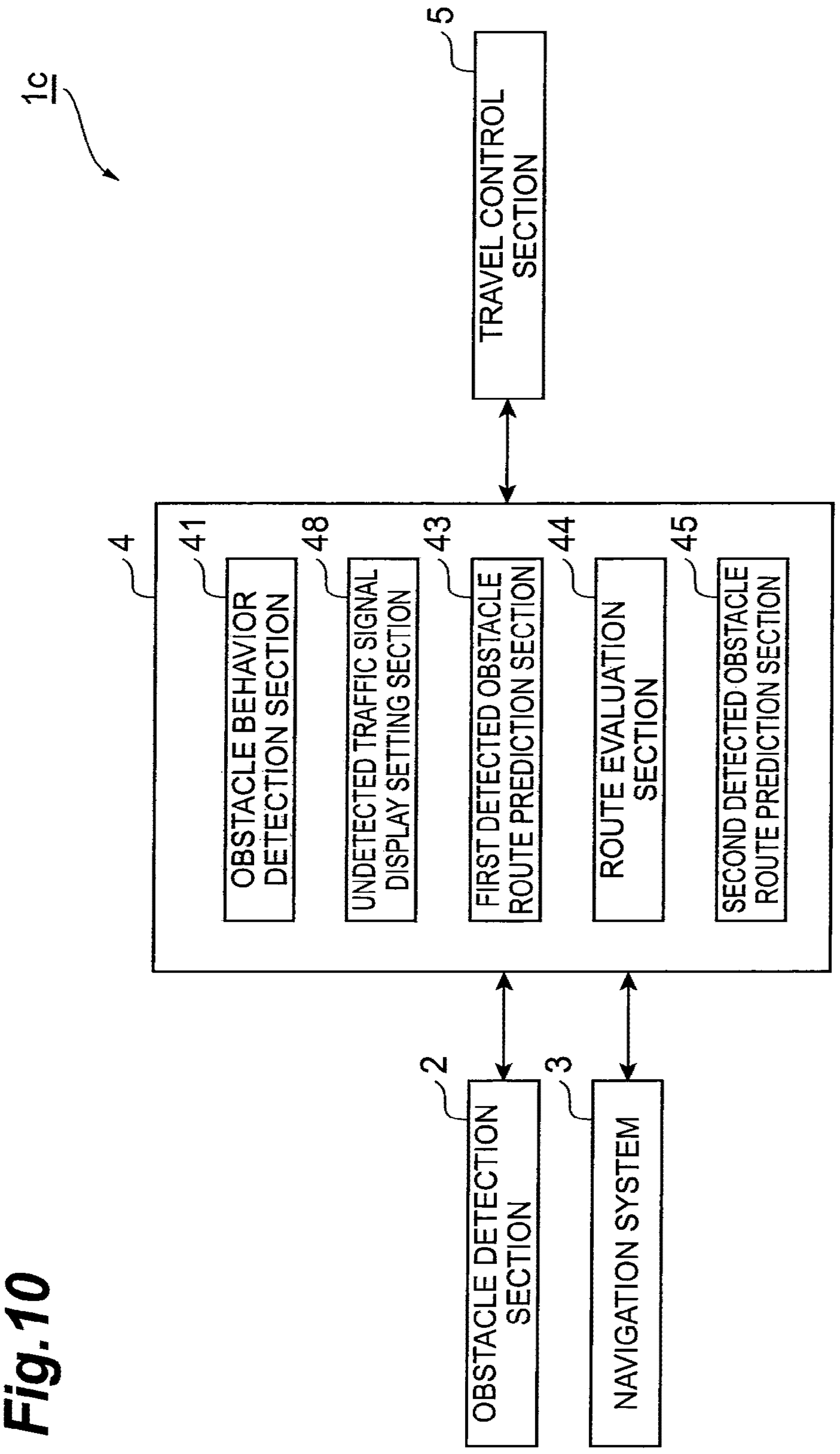
FIG. 10 is a diagram showing a configuration outline of a vehicular environment estimation device according to a fourth embodiment of the invention.

FIG. 10 is a schematic configuration diagram of a vehicular environment estimation device of this embodiment.

A vehicular environment estimation device 1*c* of this embodiment is a device that is mounted in own vehicle and estimates the travel environment of the vehicle. The vehicular environment estimation device 1*c* of this embodiment estimates the lighting display state of an undetected or unacquired traffic signal on the basis of the behaviors of detected obstacles. The vehicular environment estimation device 1*c* substantially has the same configuration as the vehicular environment estimation device 1 of the first embodiment, and is different from the vehicular environment estimation device 1 of the first embodiment in that, an undetected traffic signal display setting section 48 is provided, instead of the undetected obstacle setting section 42.

The ECU 4 includes an undetected traffic signal display setting section 48. The undetected traffic signal display setting section 48 may be configured to be executed by a program stored in the ECU 4, or may be provided as a separate unit from the obstacle behavior detection section 41 and the like in the ECU 4.

The undetected traffic signal display setting section 48 sets display of a traffic signal when a blind area is placed due to a heavy vehicle in front of the own vehicle and a sensor cannot detect display of a traffic signal or when a communication failure occurs and display information of a traffic signal cannot be acquired. The undetected traffic signal display setting section 48 functions as an undetected traffic signal display setting means that sets the display state of an undetected or unacquired traffic signal. For example, when the own vehicle cannot detect the lighting display state of a traffic signal due to a heavy vehicle in front of the vehicle at an intersection or the like, the display state of the traffic signal is supposed and set as green display, yellow display, red display, or arrow display.

Next, the operation of the vehicular environment estimation device 1*c* of this embodiment will be described.

Figure 11:
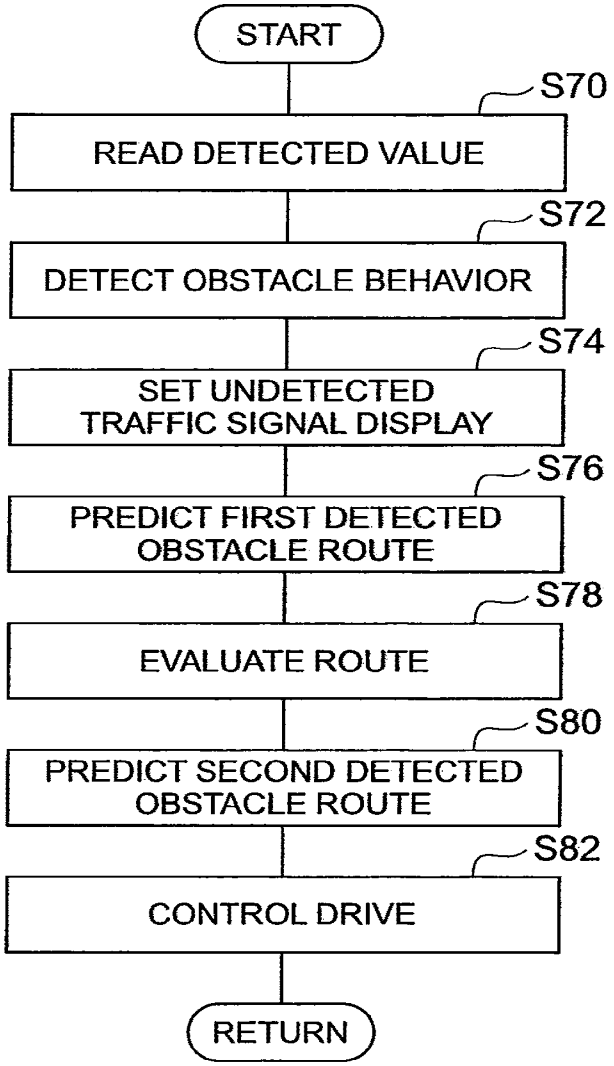
FIG. 11 is a flowchart showing an operation of the vehicular environment estimation device of FIG. 10.

FIG. 11 is a flowchart showing the operation of the vehicular environment estimation device 1*c* of this embodiment. The flowchart of FIG. 11 is executed repeatedly in a predetermined cycle by the ECU 4.

First, as shown in S70 of FIG. 11, detected value reading processing is carried out. This processing is carried out to read a detected value of the obstacle detection section 2 and a detected value regarding the own vehicle position of the navigation system 3.

Next, the process progresses to S72, and obstacle behavior detection processing is carried out. The obstacle behavior detection processing is carried out to detect the behavior of an obstacle or a mobile object, such as another vehicle, on the basis of the detection signal of the obstacle detection section 2. The obstacle behavior detection processing is carried out in the same manner as S12 of FIG. 2.

Next, the process progresses to S74, and undetected traffic signal setting processing is carried out. The undetected traffic signal setting processing is carried out in which, when the display state of a traffic signal in front of the vehicle cannot be detected or acquired, the lighting display state of the traffic signal is supposed and set. For example, the lighting display state of the traffic signal is set as red lighting, yellow lighting, green lighting, or arrow lighting.

Next, the process progresses to S76, and first detected obstacle route prediction processing is carried out. The first detected obstacle route prediction processing is carried out to predict the routes (first predicted routes) of a detected obstacle corresponding to a plurality of suppositions by the undetected traffic signal display setting processing of S74. During the first detected obstacle route prediction processing, the behavior or route of a mobile object is predicted on the basis of traffic signal display, which is supposed through S74.

Specifically, when in S74, traffic signal display is set as red display, the route of the mobile object (detected obstacle) is predicted on which the mobile object stops or reduces speed. Meanwhile, when in S74, traffic signal display is green display, the route of the mobile object is predicted on which the mobile object travels at a predetermined speed.

Next, the process progresses to S78, and route evaluation processing is carried out. The route evaluation processing is carried out to evaluate the routes of the detected obstacle predicted by the first detected obstacle route prediction processing of S76. During the route evaluation processing, the behavior detection result of the detected obstacle detected by the obstacle behavior detection processing of S72 is compared with the route prediction result of the detected obstacle predicted by the first detected obstacle route prediction processing of S76, thereby estimating the travel environment.

Figure 12:
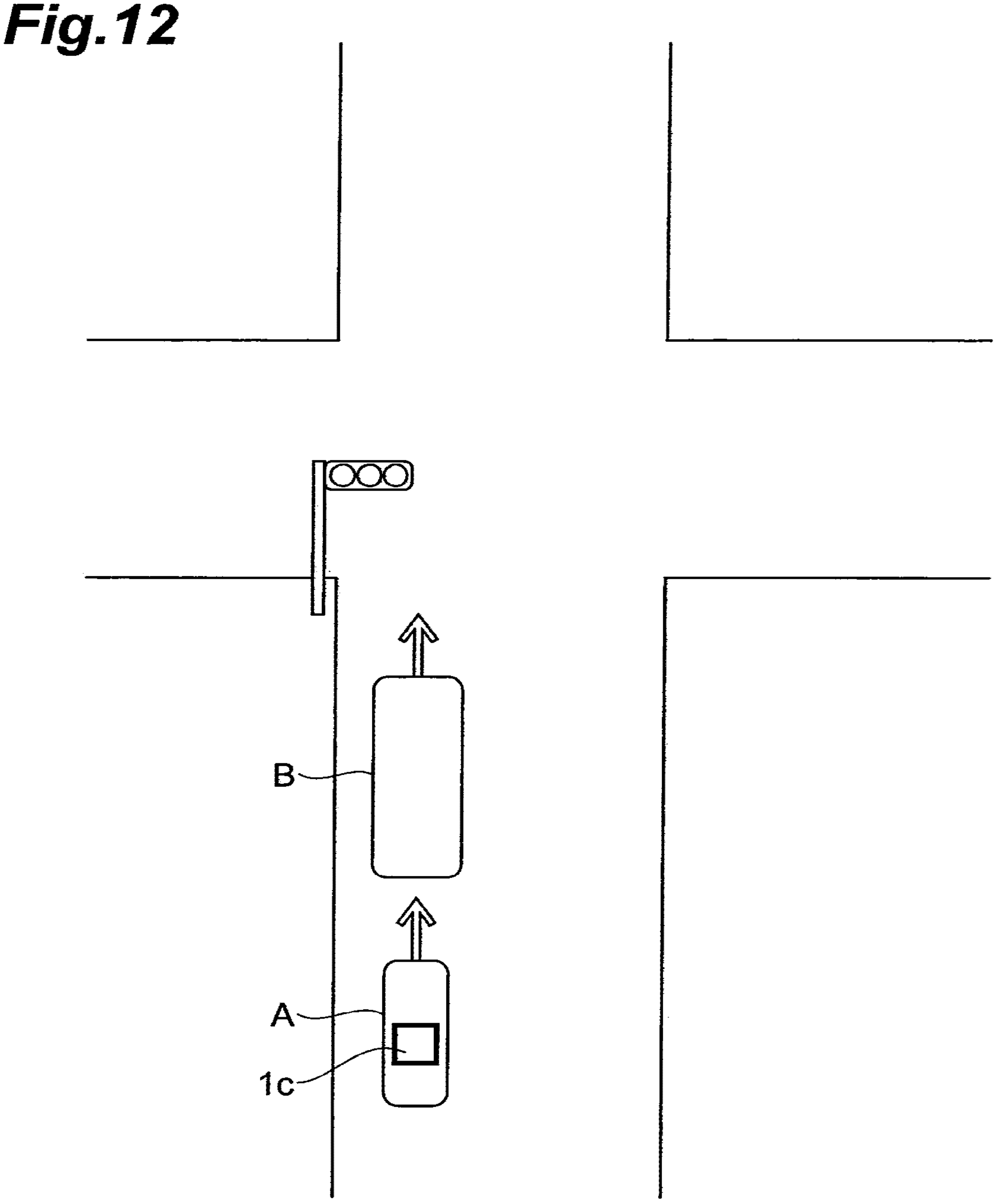
FIG. 12 is an explanatory view of vehicular environment estimation processing during the operation of FIG. 11.

For example, as shown in FIG. 12, the route of a vehicle B predicted by the first detected obstacle route prediction processing of S76 is compared with the route of the vehicle B detected by the obstacle behavior detection processing of S72. A high evaluation is provided when the route of the vehicle B predicted by the first detected obstacle route prediction processing of S76 is closer to the route of the vehicle B detected by the obstacle behavior detection processing of S72. Then, from among the routes of the vehicle B predicted by the first detected obstacle route prediction processing of S76, a route which is closest to the route of the vehicle B predicted by the obstacle behavior detection processing of S72 is selected as a predicted route. The display state of a traffic signal D is supposed on the basis of the selected predicted route of the vehicle B as the vehicle travel environment, which affects the traveling of the vehicle B, or the vehicle travel environment of the blind area S of the own vehicle A. For example, when a route on which the vehicle B stops at the intersection is predicted as the predicted route of the vehicle B, display of the traffic signal D is estimated as red display.

Next, the process progresses to S80, and second detected obstacle route prediction processing is carried out. The second detected obstacle route prediction processing is carried out to predict the route of the obstacle detected in S72. For example, during the second detected obstacle route prediction processing, the route (second predicted route) of the mobile object detected by the obstacle behavior detection processing of S72 is predicted on the basis of the evaluation result by the route evaluation processing of S78. For example, referring to FIG. 12, the route of the vehicle B is predicted on the basis of the display state of the traffic signal D.

Next, the process progresses to S82 of FIG. 11, and drive control processing is carried out. The drive control processing is carried out to perform drive control of the own vehicle. Drive control is executed in accordance with the result of detected obstacle route prediction of S80. The drive control processing is carried out in the same manner as S22 of FIG. 2.

As described above, according to the vehicular environment estimation device 1*c* of this embodiment, in addition to the advantages of the vehicular environment estimation device 1 of the first embodiment, it is possible to estimate the display state of the traffic signal in front of the vehicle on the basis of the behavior of a detected obstacle. For this reason, it is possible to accurately estimate the display state of a traffic signal which cannot be recognized from the own vehicle but can be recognized from a mobile object in the vicinity of the own vehicle.

The foregoing embodiments are for illustration of the exemplary embodiments of the vehicular environment estimation device of the invention; however, the vehicular environment estimation device of the invention is not limited to those described in the embodiments. The vehicular environment estimation device of the invention may be modified from the vehicular environment estimation devices of the embodiments or may be applied to other systems without departing from the scope of the invention defined by the appended claims.

For example, during the route evaluation processing of S18 and the like in the foregoing embodiments, the state of an undetected obstacle supposed on a first predicted route, which most conforms to the detection result selected in S18, may be used as the estimation result of the travel environment as it is.

During the second detected obstacle route prediction processing of S20 and the like in the foregoing embodiments, the first predicted route selected in S18 (the route having highest similarity to the detection result) may be set as the second predicted route. In addition, during the second detected obstacle route prediction processing of S20 and the like in the foregoing embodiments, at the time of comparison in S18, the similarity of each first predicted route may be calculated, and a plurality of first predicted routes may be combined in accordance with the similarities to obtain a second predicted route.

During the undetected obstacle route prediction processing in the foregoing embodiments, route prediction may be carried out on the basis of a plurality of undetected obstacle states which are estimated at different times.

During the drive control processing in the foregoing embodiments, instead of drive control of the vehicle, a drive assistance operation, such as a warning or notification to the driver of the vehicle, may be carried out.

INDUSTRIAL APPLICABILITY

According to the invention, it is possible to accurately estimate the travel environment around the own vehicle on the basis of the predicted route of a mobile object, which is moving in the blind area.

The invention claimed is:

1. A vehicular environment estimation device of a vehicle comprising:

an electronic control unit configured to:

detect a route of a mobile object in surroundings of the vehicle on the basis of the mobile object detected by a sensor of the vehicle;

estimate a behavior of an undetected object in a blind area of the vehicle on the basis of the detected route of the mobile object;

predict a plurality of routes of the mobile object on the basis of the estimated behavior of the undetected object;

compare each of the predicted routes of the mobile object with the detected routes of the mobile object;

set an evaluation of each of the predicted routes of the mobile object higher the closer the predicted route of the mobile object compares to the detected routes of the mobile object;

predict a route of the mobile object based upon the evaluations; and carry out drive control of the vehicle on the basis of the predicted route of the mobile object, wherein the undetected object in the blind area of the vehicle is different from the mobile object, the undetected object in the blind area of the vehicle is a moving object on a road intersecting a road on which the vehicle travels, and the undetected object in the blind area of the vehicle has not yet been detected.

2. The device according to claim 1, wherein the undetected object includes a second mobile object, and the electronic control unit is configured to predict a behavior of the second mobile object as an environment of the blind area of the vehicle.

3. The device according to claim 1, wherein the electronic control unit is configured to:

detect a plurality of behaviors of mobile objects;

estimate an environment of the blind area of the vehicle on the basis of the plurality of behaviors of the mobile objects; and determine that a mobile object, which does not behave in accordance with the estimated environment of the blind area of the vehicle, behaves abnormally.

4. A method comprising:

detecting a route of a mobile object in surroundings of a vehicle on the basis of the mobile object detected by a sensor of the vehicle;

estimating a behavior of an undetected object in a blind area of the vehicle on the basis of the detected route of the mobile object;

predicting a plurality of routes of the mobile object on the basis of the estimated behavior of the undetected object;

comparing each of the predicted routes of the mobile object with the detected routes of the mobile object;

setting an evaluation of each of the predicted routes of the mobile object higher the closer the predicted route of the mobile object compares to the detected routes of the mobile object;

predicting a route of the mobile object based upon the evaluations; and carrying out drive control of the vehicle on the basis of the predicted route of the mobile object, wherein the undetected object in the blind area of the vehicle is different from the mobile object, the undetected object in the blind area of the vehicle is a moving object on a road intersecting a road on which the vehicle travels, and the undetected object in the blind area of the vehicle has not yet been detected.

* * * * *